United States Patent Office 3,309,431
Patented Mar. 14, 1967

3,309,431
METHOD FOR THE PREPARATION OF TRI-TERTIARY ALKYL PHOSPHITES
Victor Mark, Olivette, and Theodor Reetz, Webster Groves, Mo., assignors to Monsanto Company, a corporation of Delaware
No Drawing. Filed Feb. 21, 1963, Ser. No. 260,318
6 Claims. (Cl. 260—976)

The present patent application is a continuation in part of copending application, Ser. No. 248,192, filed December 31, 1962, now abandoned.

The present invention relates to the preparation and use of tri-tertiary alkyl phosphites. It is an object of the invention to prepare tri-tertiary alkyl phosphites employing a new process. It is also an object to prepare certain tri-tertiary alkyl phosphites as new compositions of matter. Further objects of the present invention are the provision of compounds which because of their oxygen absorption ability have utility in oxidation resistant compositions for specific applications including lubricating oils, functional fluids, food additive formulations, gasoline modifiers, ozone-resisting rubber compositions, ozone resistant plastics, etc.

In the conventional preparation of the various alkyl phosphites it has been recognized that the production of tri-tertiary phosphites is accompanied by serious difficulties. For example, the tri-normal-alkyl phosphites are prepared without difficulty, but it has been recognized such as by W. Gerrard et al., J. Chem. Soc. (1953), 1920; and H. Goldwhite and B. C. Saunders, J. Chem. Soc. (1957), 2409 that tri-tertiary alkyl phosphites cannot be prepared. The reasons for the impossibility of such preparations by prior art methods are not known.

It has now been found that tri-tertiary alkyl phosphites may readily be prepared in good yield if the preparation is carried out under certain specified conditions as set forth herein. The present reaction is carried out using phosphorus trichloride in the proportion of 1 mole with at least 3 moles of the tertiary alcohol and with a similar proportion, e.g., at least 3 moles of an acid acceptor. The tertiary alcohols contemplated in the practice of the present invention have at least 4 carbon atoms, a preferred group of alcohols being those having from 4 to 20 carbon atoms including tertiary butanol, tertiary pentanol, the tertiary hexanols, heptanols, octanols, nonanols, decanols, undecanols, dodecanols, tridecanols tetradecanols, pentadecanols, hexadecanols, heptadecanols, octadecanols, nonadecanols and the other tert alcohols having up to 20 carbon atoms.

The aliphatic radicals which are present in the tri-tert-alkyl phosphites of the present invention, are tertiary radicals, hence are linked to three carbon atoms. These latter carbon atoms may be further substituted, such as by hydrogen, alkyl, including saturated, linear and cyclic, olefinic and acetylenic radicals, aryl, such as phenyl or naphthyl radicals and heterocyclic substituents such as furfuryl, pyridyl, thenyl, and other groups. The various groups set forth above may also have further substituents.

The new process can successfully be applied for the synthesis of tertiary phosphorous esters of unsaturated, including olefinic and acetylenic, alcohols and of esters derived from cyclic alcohols, including aromatic alcohols. Representative examples include 1,1-dimethyl-2-propen-1-ol and its homologs, 1,1-dimethyl-3-propyn-1-ol and its homologs, 1-methylcyclopentanol, 1-methylcyclohexanol, 1,1-dimethylbenzyl alcohol and heterocyclic alcohols such as 1,1-dimethylfurfuryl alcohol and dimethyl thenyl carbinol.

The acid acceptor employed in the practice of the present invention is an alphatic amine such as trimethylamine, triethylamine, triethanol amine and their homologs. In general the preferred group of hydrochloric acid acceptors are aliphatic amines of from 3 to 20 carbon atoms. Aromatic amines have been found not to be suitable bases for the reaction.

It has been found essential that the above reaction be concluded at a temperature of from 20° C. to 50° C. While somewhat higher or lower temperatures may be used during the first part of the reaction, the above temperature conditions are necessary during the concluding part of the reaction. It has been found that at lower temperatures the reaction goes only as far as the production of the dialkyl chlorophosphite, but that the tri-substituted compound is not quantitatively obtained. Various non-reaction solvents such as ether, butane, pentane, acetone, benzene, chlorobenzene or methylene chloride may be used in carrying out the present process.

The following examples illustrate specific embodiments of the present invention.

Example 1

To a reaction vessel, equipped with a Hershberg stirrer, dropping funnel, thermometer, and a vent line leading to a nitrogen atmosphere, there is charged 1.1 mole of triethylamine, 1.0 mole of tertiary butyl alcohol and 1 liter of anhydrous ether. The solution is cooled to $+2°$ C. after which a solution of 0.33 mole of $PCl_3$ in 100 ml. of ether is added at such a rate as to keep the temperature of the reaction mixture below $+5°$. After the addition is completed, (in about a two hour period), the slurry is stirred between $+2$ and $+5°$ for an additional hour. Workup of the reaction mixture by filtration and stripping of the solvent yields a product in which the major constituent is di-tert-butyl phosphorochloridite, (tert-$C_4H_9O)_2PCl$, as indicated by $P^{31}$ nuclear magnetic resonance spectroscopy ($\sigma=-170.3$ p.p.m.).

It is found that dimethyl aniline is ineffective as the acid acceptor in the preparation using tert butyl alcohol. When this reaction is attempted with ethanol, only the tri-substituted compound is obtained.

Example 2

The procedure of Example 1 is repeated, except that the cold reaction mixture is allowed to warm to 25°. Workup yields a pale yellow oil, the analysis of which by $P^{31}$ NMR indicated the product to be essentially tri-tert-butyl phosphite ($\sigma=-137.8$ p.p.m.).

Example 3

The procedure of Example 2 is repeated, except that tert-pentyl alcohol(tert-amyl alcohol) is substituted for the butyl alcohol. The formation of tri-tert-pentyl phosphite is indicated by $P^{31}$ NMR analysis ($\sigma=-138.6$ p.p.m.).

Example 4

The procedure of Example 2 is repeated, except that the equivalent amount of 1,1-dimethyl-2-propen-1-ol is substituted for tert-butyl alcohol. The tert-phosphite; tris(1,1-dimethyl-2-propen-2-yl) phosphite is obtained in excellent yield ($\sigma=-140.2$ p.p.m.).

Example 5

When the equivalent amount of 1-methyl-cyclohexanol is substituted for tert-butyl alcohol in Example 2, the compound tris(1-methylcyclohexyl) phosphite is obtained, together with some hydrogen phosphonate.

Example 6

The substitution of 1,1-dimethylbenzyl alcohol for tert-butyl phosphite in the process of Example 1 results in the formation of tris(1,1-dimethylbenzyl) phosphite.

What is claimed is:

1. Method for the preparation of tri-tertiary alkyl phosphites having from 4 to 20 carbon atoms in each alkyl radical, which comprises mixing and contacting phosphorus trichloride in the proportion of one mole thereof with at least three molar proportions of tertiary alcohol having from 4 to 20 carbon atoms in the presence of at least a similar molar proportion of an acid acceptor selected from the group consisting of tertiary saturated aliphatic amines having from 3 to 20 carbon atoms, the said mixing and contacting being concluded at a temperature of from 20° C. to 50° C.

2. Method for the preparation of tri-tert-butyl phosphite which comprises mixing and contacting phosphorus trichloride in the proportion of one mole thereof with at least three molar proportions of tert-butyl alcohol in the presence of at least a similar proportion of an acid acceptor selected from the group consisting of tertiary saturated aliphatic amines having from 3 to 20 carbon atoms, the said mixing and contacting being concluded at a temperature of from 20° C. to 50° C.

3. Method for the preparation of tris(1,1-dimethyl-2-propen-1-yl) phosphite which comprises mixing and contacting phosphorus trichloride in the proportion of one mole thereof with at least three molar proportions of 1,1-dimethyl-2-propen-1-ol in the presence of at least a similar proportion of an acid acceptor selected from the group consisting of tertiary saturated aliphatic amines having from 3 to 20 carbon atoms, the said mixing and contacting being concluded at a temperature of from 20° C. to 50° C.

4. Method for the preparation of tris(1,1-dimethylbenzyl) phosphite which comprises mixing and contacting phosphorus trichloride in the proportion of one mole thereof with at least three molar proportions of 1,1-dimethylbenzyl alcohol in the presence of at least a similar proportion of an acid acceptor selected from the group consisting of tertiary saturated aliphatic amines having from 3 to 20 carbon atoms, the said mixing and contacting being concluded at a temperature of from 20° C. to 50° C.

5. Method for the preparation of tri-tert pentyl phosphite which comprises mixing and contacting phosphorus trichloride in the proportion of one mole thereof with at least three molar proportions of tert-pentyl alcohol in the presence of at least a similar proportion of an acid acceptor selected from the group consisting of tertiary saturated aliphatic amines having from 3 to 20 carbon atoms, the said mixing and contacting being concluded at a temperature of from 20° C. to 50° C.

6. Method for the preparation of tris(1-methylcyclohexyl) phosphite which comprises mixing and contacting phosphorus trichloride in the proportion of one mole thereof with at least three molar proportions of 1-methylcyclohexanol in the presence of at least a similar proportion of an acid acceptor selected from the group consisting of tertiary saturated aliphatic amines having from 3 to 20 carbon atoms, the said mixing and contacting being concluded at a temperature of from 20° C. to 50° C.

References Cited by the Examiner

UNITED STATES PATENTS

| | | | |
|---|---|---|---|
| 1,993,723 | 3/1935 | Kyrides | 260—461.315 |
| 2,226,552 | 12/1940 | Conary et al. | 260—958 |
| 2,408,744 | 10/1946 | Engel | 260—976 |
| 2,905,705 | 9/1959 | Kohler et al. | 260—976 |
| 2,950,290 | 8/1960 | Hort | 260—958 |
| 3,068,269 | 12/1962 | Streich et al. | 260—976 |

OTHER REFERENCES

Baddiley et al.: "J. Chem. Soc.," pp. 815–821 (1949).

Chadaeva et al.: "Chem. Abst.," volume 45, col. 1504–1505 (1950).

Kosolapoff: "J. Am. Chem. Soc.," vol. 74, p. 4953 (1952).

CHARLES B. PARKER, *Primary Examiner.*

FRANK SIKORA, B. BILLIAN, *Assistant Examiners.*

UNITED STATES PATENT OFFICE
CERTIFICATE OF CORRECTION

Patent No. 3,309,431            March 14, 1967

Victor Mark et al.

It is hereby certified that error appears in the above numbered patent requiring correction and that the said Letters Patent should read as corrected below.

Column 2, line 60, for "tris(1,1-dimethyl-2-propen-2-yl) phosphite" read -- tris(1,1-dimethyl-2-propen-1-yl) phosphite --.

Signed and sealed this 24th day of September 1968.

(SEAL)
Attest:

Edward M. Fletcher, Jr.            EDWARD J. BRENNER

Attesting Officer            Commissioner of Patents